(12) United States Patent
McNulty et al.

(10) Patent No.: US 8,378,815 B1
(45) Date of Patent: Feb. 19, 2013

(54) ASSET TRACKING WITH ERROR ADAPTIVE BOUNDARY

(75) Inventors: John E. McNulty, Dallas, TX (US); Gregory M. Jones, Plano, TX (US)

(73) Assignee: Gemalto SA, Meudon (FR)

( * ) Notice: Subject to any disclaimer, the term of this patent is extended or adjusted under 35 U.S.C. 154(b) by 302 days.

(21) Appl. No.: 12/914,774

(22) Filed: Oct. 28, 2010

(51) Int. Cl.
*G08B 1/08* (2006.01)

(52) U.S. Cl. ............... 340/539.13; 340/988; 340/572.4; 340/8.1

(58) Field of Classification Search ............. 340/539.13, 340/988, 426.19, 431, 989, 992, 6.1, 8.1, 340/571, 572.4; 701/32.3, 32.4, 32.5
See application file for complete search history.

(56) References Cited

U.S. PATENT DOCUMENTS

| | | | |
|---|---|---|---|
| 6,665,613 B2 | 12/2003 | Duvall | |
| 6,721,652 B1 | 4/2004 | Sanqunetti | |
| 6,982,656 B1 | 1/2006 | Coppinger et al. | |
| 7,164,986 B2 | 1/2007 | Humphries et al. | |
| 2003/0030561 A1 | 2/2003 | Yafuso et al. | |
| 2004/0219932 A1 | 11/2004 | Verteuil | |
| 2008/0042901 A1* | 2/2008 | Smith et al. | ............... 342/464 |
| 2008/0125964 A1 | 5/2008 | Carani et al. | |
| 2008/0125965 A1* | 5/2008 | Carani et al. | ............... 701/207 |
| 2009/0055091 A1 | 2/2009 | Hines et al. | |
| 2009/0093958 A1 | 4/2009 | Wang et al. | |
| 2009/0115609 A1* | 5/2009 | Weaver | ............... 340/572.1 |

* cited by examiner

*Primary Examiner* — Toan N Pham
(74) *Attorney, Agent, or Firm* — Pehr B. Jansson; The Jansson Firm (57) ABSTRACT

Systems and methods for tracking assets from central stations using tracking devices enabled to receive GPS coordinates or site identities broadcast from transmitters at fixed locations within a wireless network. Plural position fixes are taken over time and forwarded to the central station. The position fixes are compared to establish a likelihood that apparent excursions from a predetermined boundary area are valid or not, prior to generating an alert signal that the asset has moved from the boundary area.

35 Claims, 8 Drawing Sheets

Fig. 1

| Term. | Closest | Proximate | Adjacent | Distant |
|---|---|---|---|---|
| T1 | A04 | A01, A05 | A07, A08 | A02, A03, A06, A09, A10, A11, A12 |
| T2 | A05 | A02, A06, A07 | A01, A04 | A03, A08, A09, A10, A11, A12 |
| T3 | A07 | A04, A05, A08 | A06, A09, A10 | A01, A02, A03, A11, A12 |

Fig. 2 Cell Site Table

ASSET TRACKING WITH ERROR ADAPTIVE BOUNDARY

BACKGROUND OF THE INVENTION

1. Field of the Invention

The present invention relates to wireless asset tracking with respect to bounded regions. More particularly, the present invention relates to systems and methods for reducing false positive geofence boundary crossing alert signals.

2. Description of the Related Art

Techniques for wireless asset tracking are known in the art. Global Positioning Satellite ("GPS") based tracking systems have been employed for a number of years. Tracking movements of long haul truck assets is a known example of GPS based tracking systems. In such a system, an antenna and GPS receiver are mounted to a truck, and are further coupled to a wireless transceiver having access to a wireless network. The GPS receiver outputs position fixes, comprising latitude and longitude coordinates and other data, which are coupled to the wireless transceiver so that position reports can be communicated through the network and back to a central station. In this manner, the truck can be tracked as it moves about the roadways. In a monitored mode of operation, an operator at the central station located on the network observes the movement of the truck, looking for any excursions or inordinate time variances beyond what is expected for the particular truck. Such prior art systems have certain limitations. For example, since it is common knowledge that long haul trucks have GPS tracking systems, it is appreciated that disabling such a system will prevent the truck from being tracked.

The utilization of position reports communicated by tracked assets is an area of technology that has also advanced. In the preceding example, it can be appreciated that employing a person to continually monitor the movement of plural assets has a number of cost and reliability issues. Also, since most trucks operate along predetermined routes, it can be appreciated that giving careful attention to an asset that is located along its predetermined route is not an efficient use of a monitoring asset. Rather, it is excursions from the predetermined route that are of most interest. Thus, the concept of defining boundaries for areas of operation is known. The industry has defined a term to describe the boundaries of a predetermined area of operation, and that term is a "geofence". More particularly, a geofence is a virtual perimeter for a real-world geographic area. Since many prior art tracking systems operate using latitude and longitude ("lat/lon") coordinates, geofence boundaries have been defined in similar terms. For example, a radial geofence may be defined by its lat/long center position and a predetermined radius. Also, polygonal geofences may be defined using three or more lat/lon vertices with lines interconnecting them so as to define a bounded area. Thus, the extent of such a geofence definitions is mathematically determined and established with a precision of the lat/lon coordinates. In the case of GPS lat/lon fixes, the coordinates typically include degrees of lat/lon and minutes of angle to at least four decimal places. Thus, it can be appreciated that geofence boundary definitions and boundary excursion calculations are relatively precise and adaptable for computer based calculations and related processing.

Although GPS coordinate based tracking is known and somewhat prevalent in the prior art, it is not the only tracking technique known. Nor is GPS position determination necessarily preferred for certain applications. For GPS receivers to produce reliable and accurate position fixes, the antenna must have clear 'view' of three GPS satellites, and preferably four. With an unobstructed view from horizon to horizon a high degree of reliability can be achieved. However, in real-world tracking environments, the skies are not so unobstructed and weather is a significant factor as well. Also, not all assets are moving assets located out of doors. When an asset is locate adjacent to or within a building or structure, GPS reliability drops precipitously. Thus, other location determining technologies have been employed. The LORAN terrestrial based navigation system is known, which employs radio triangulation from plural fixed position radio transmitters. Similarly, there are a number of fixed radio transmitter location networks that can be utilized in asset tracking application. Cellular telephone transmitter sites are one example. Increasingly, other fixed radio transmitter networks are being deployed, including IEEE 802.11(WiFi) networks, IEEE 802.16 (WiMax), Bluetooth, and other LAN and WAN telecommunications networks. These networks can be employed for location determination for asset tracking purposes. And, geofence boundaries can be defined in terms compatible with the locating techniques employed.

The accuracy of geofence boundary definitions can be rather precise, as was discussed above. So too can the apparent accuracy of position fixes. Thus, it appears to be a simple computational task to extract a position fix from a position report communicated from a tracking device coupled to an asset, and then compare it to a predetermined geofence boundary definition to determine if a geofence boundary excursion has occurred. However, the real-world experience is that while position fixes have apparent precision, they commonly do not posses actual precision. For example, a GPS tracking device will report a fix with six to seven significant digits in the lat/lon coordinates, yet that fix may deviate several hundred meters from the physical geographic location of the asset. The vagaries GPS radio propagation and receiver errors are significant, and generally degrade with weather and obstructions. Thus, the reported position of a fixed position asset may come to appear random when comparing multiple reports over time. The net result is that when an asset is located physically close to a geofence boundary, the probability of false positive excursion reports increases.

Of course, degrees of accuracy are more or less significant depending on the application and metrics of the geofence containment requirements. The other tracking technologies, as will be more fully discussed herein, suffer from similar accuracy and false positive excursion reports. Since an essential function of an asset tracking system that relies on predetermined boundaries is to report excursion therefrom, the likelihood of false positive excursion reports is problematic. Generally speaking, when an asset is contained within a geofence boundary, the user or owner of the asset commits no action, and consumes no additional assets beyond normal operation. However, where there is a geofence excursion report, some reaction or corrective action is generally required. Thus, a false positive excursion report is tantamount to a false alarm, the reaction to which can be costly. Furthermore, repeated false positive excursion reports tend to degrade confidence in the tracking operation as a whole, and may lead to the situation where true positive reports are ignore. Thus, it can be appreciated that there is a need in the art from a systems and methods for reducing false positive geofence boundary crossing reports and alert signals.

SUMMARY OF THE INVENTION

The need in the art is addressed by the systems and methods of the present invention. The present invention teaches a system and method of tracking assets from central stations using tracking devices enabled to receive site identities broadcast from transmitters at fixed locations within a wireless network, and enabled to wirelessly communicate position reports to the central stations. The systems and methods operate by attaching a tracking device to an asset, and placing the asset into service within the wireless network. Then commence with tracking the location of the asset by periodically communicating position reports containing current site identities from the tracking device to a central station. Upon receipt at the central station of a first position report containing a first site identity, comparing the first site identity with a default list of site identities corresponding to the tracking device, and disregarding the first position report and continuing the tracking step if the first site identity is found within the default list. Or, storing the first site identity if the first site identity is not found within the default list. Then, upon receipt at the central station of a subsequent position report containing a second site identity, comparing the second site identity with the default list, and adding the first site identity to the default list and continuing the tracking step if the second site identity is found on the default list. Finally, producing an alert signal if the second site identity is not found on the default list.

In specific embodiments of the foregoing systems and methods, wherein the wireless network is a cellular telephone network, the periodically communicating position reports function is accomplished using the cellular telephone network. In a refinement to these embodiments, the tracking device is a conventional cellular telephone.

In specific embodiments of the foregoing systems and methods, the central station is an Internet server. In other specific embodiments, the systems and methods further define an initialization period duration, and then, during the initialization period, add all of the site identities received in the position reports to the default list of site identities corresponding to the tracking device. In other specific embodiments, the systems and methods further include attaching plural tracking devices to plural assets, and then, during the initialization period, additionally, add all of the site identities received in the position reports from the plural tracking devices to the default list of site identities. In specific embodiments of the foregoing systems and methods, they include running the initialization period upon receiving a corresponding command from the tracking device or the central station.

In specific embodiments of the foregoing systems and methods, they further include storing the default list of site identities in the central station. In other specific embodiments, they include the function of predetermining the default list of site identities prior to performing the tracking step.

The present invention teaches a system and method of tracking assets to detect valid geofence boundary excursions from central stations using tracking devices that are enabled to produce present location geographic fixes, and are enabled to wirelessly communicate position reports to the central stations. This system and method includes the functions of attaching a tracking device to an asset, and placing the asset into service within the boundary of the geofence. Then, tracking the location of the asset by periodically communicating position reports containing present geographic fixes from the tracking device to a central station, and repeatedly updating a buffer for storing a previous position fix and a penultimate position fix. Upon receiving a present position report having a present position fix, and updating the buffer, and determining if the present position fix is an excursion from the geofence boundary. Then, continuing the tracking step if the present position fix is not an excursion. Or, if the present position fix is an excursion, then calculating a first vector angle between the penultimate fix and the previous fix, and calculating a second vector angle between the previous position fix and the present position fix, and calculating a differential angle between the first vector angle and the second vector angle. Then, comparing the differential angle with a threshold angle and continuing the tracking step if the differential angle is greater than the threshold angle, or producing an alert signal if the differential angle is less than the threshold angle.

In specific embodiments of the foregoing systems and methods, the central station is an Internet server. In other specific embodiments, they further include periodically communicating position reports step is accomplished using a cellular telephone network. In other specific embodiments, the communicating position reports function is preformed repeatedly at fixed time intervals. In other embodiments, the communicating position reports function is preformed upon the occurrence of an excursion from the geofence boundary.

In specific embodiments of the foregoing systems and methods, they provide that upon determining that the present position fix is an excursion from the geofence boundary, and if the previous fix was also an excursion from the geofence boundary, then producing an alert signal. In other specific embodiments, the systems and methods include the functions of storing a radial geofence boundary in the tracking device, where the determining if the present position fix is an excursion from the geofence boundary function is accomplished by the tracking device.

In specific embodiments of the foregoing systems and methods, they provide that the geographic fix includes GPS position data. In other specific embodiments, they operate such that if the present position fix is an excursion, then calculating a first vector length between the previous position fix and the present position fix, comparing the first vector length with a factor proportional to the geofence size, and producing an alert signal if the first vector length exceeds the proportional factor.

DESCRIPTION OF THE INVENTION

Illustrative embodiments and exemplary applications will now be described with reference to the accompanying drawings to disclose the advantageous teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The present invention advances the art by providing systems and methods for suppressing false positive alerts in wireless asset tracking system. These systems may include tracking devices that provide geographic coordinate position fixes and those that provide communication site references to report location. Geographic position fixes may comprise specific latitude and longitude ("lat/lon") coordinates. Communications site reference may include cellular telephone cell site identities, or other discrete indicators of each given transmitter's identity. The geographic locations of such transmitters may, or may not, be known. As position reports are sequentially received at a central station, an analysis is conducted, which considers prior position reports, to determine a likelihood that the present position report indicates a true excursion from a predetermined geographic area. The geographic area may be defined by a geofence, or by other parameters.

In an environment where a large number of assets are tracked using a large number of wireless tracking devices, it is useful to communicate position reports through a network to a central station. The Internet is a good option for this function. The central station processes the communicated position reports and presents the tracking information in some useful fashion, such as to a graphical display, for example. The information may also be communicated to remote stations. It is further useful to organize the information into standardized formats and data structures so that it can be accessed and utilized in a consistent fashion. Raw information may be further processed locally and translated into other useful formats. Asset positions, tracks of movement and various alterations may also be generated from this information. Remote resource may be accessed to assist in the translation, communication, and presentation of the tracking information. All of these functions require the consumption of processor and network resource, and may also consume various third party resources. By way of example, raw lat/long coordinates may be organized and plotted onto maps provided by a third parties. Cellular transmitter site identities may be converted to geographical coordinates, and also mapped. Satellite imagery may be overlaid onto maps, as well as graphical representations of object and assets presented. The processed information may be made available to multiple locations around the network, and so forth. A central station may be operated by a service provider who also serves large numbers of fleets of assets. Thus, is can be appreciated that there are strong incentives to minimize the consumption of network, processor, and financial resources in providing asset tracking services.

Figure 1:
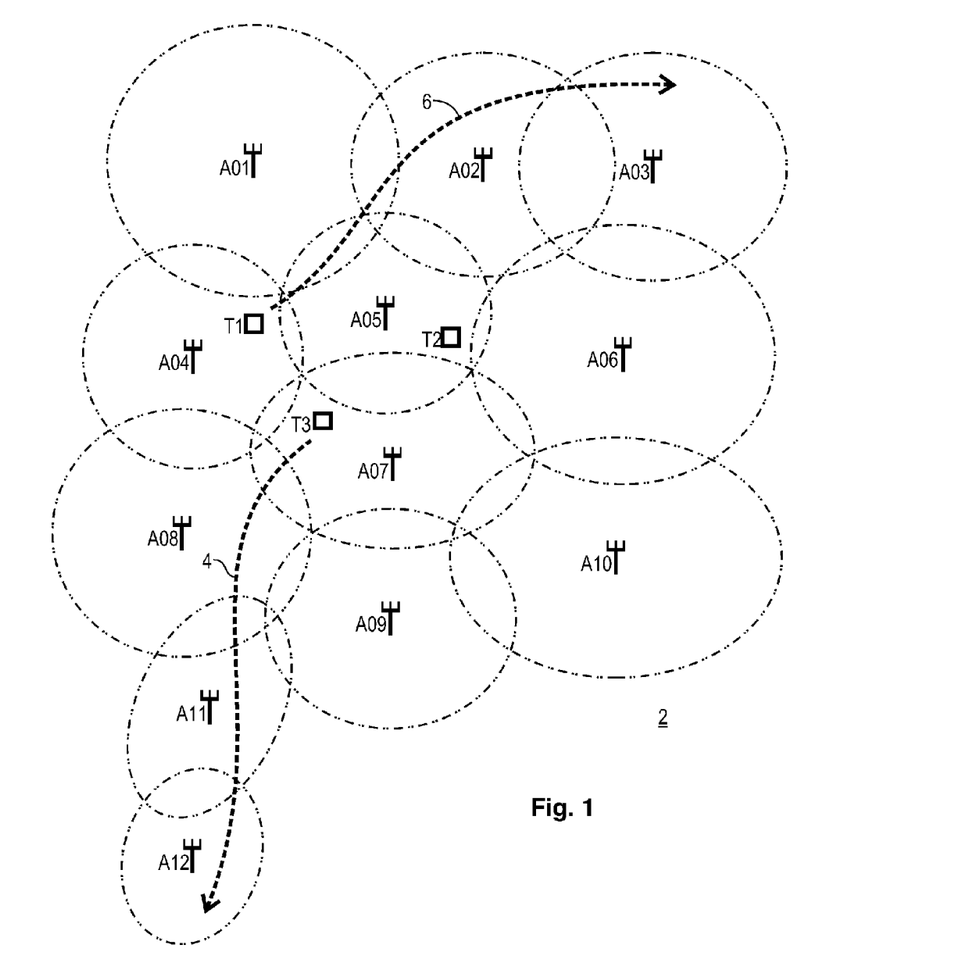
FIG. 1 is an area diagram for a cellular based fixed asset tracking system according to an illustrative embodiment of the present invention.

Reference is directed to FIG. 1, which is a geographic area 2 diagram for a cellular network based fixed asset tracking system according to an illustrative embodiment of the present invention. This particular embodiment utilizes existing fixed cellular network transmitter sites, and the fact that each site broadcasts a unique site identity, as a geographic reference in tracking assets. A tracking device is coupled to an asset, and the tracking device operates to receive the cellular transmitter site identities, and then incorporates those identities into position reports it separately communicates back to a central station. It is known to receive a cellular transmitter site identity and convert that to a lat/long coordinate, which can then be used to establish an approximate position fix for a tracking device. However, this approach requires that such a translation be accomplished, and that consumes both processing power and the consumption of a third party resource for the translation, in the form of an external database. When such an action is taken thousands, or perhaps hundreds of thousands of times, there is a strong incentive to avoid such a process. The illustrative embodiment achieves this goal by conducting an analysis that relies only on the site identities. In this embodiment, the tracking of fixed assets is first considered. Tracking fixed assets is useful for assuring the owner of an asset that it has not been removed from its intended fixed location. An example of fixed asset tracking would be business that provides gaming terminals for sports bars.

Gaming terminals are valuable assets that are placed into specific geographic locations in exchange for a payment arrangement based on the use of the terminal. Such terminals will generally remain in operation for an extended period of time, perhaps several years. It is important to track the location to avoid theft and to prevent misuse of the terminals. As long as the terminal remains in the proper location, there is no concern from a tracking perspective. If the terminal is moved, the owner needs to know promptly, and react to preserve the asset. Fitting the asset with a tracking device adds to the cost of the asset, so there is a incentive to minimize cost. Also, since the gaming terminal operates indoors, the use of GPS tracking is problematic in that reliable GPS reception is unlikely. Cellular telephone coverage is more ubiquitous, so it is a viable technology. Additionally, since cellular networks carry data and are interconnected to the Internet, the cellular service is a good choice to host the communications between the tracking device and the central station.

FIG. 1 illustrates an application of the present invention in tracking fixed assets, such as gaming terminals, which are represented as terminals T1, T2, and T3 in FIG. 1. The terminals are geographically distributed within a cellular telephone network including plural transmitter tower sites with corresponding coverage areas, represented in FIG. 1 as areas A01 through A12. More particularly, terminal T01 is located in the coverage area of cell site A04, terminal T2 is in cell site A05, and terminal T03 is in cell site A07. However, the relationship between radio transmitter coverage area and geographic location does not correlate so simply. In fact, radio coverage areas overlap to a great extent, and continually change in pattern as a result of topology, weather, antenna orientation, reflections, refractions and a number of other factors known to those skilled in the art. In addition, in the case of cellular service networks, network traffic is managed by the network by assigning terminals to specific cell sites. For example, assume a tracking device is currently registered on a first cell site, but that cell site becomes overly busy. The network load-shifts the traffic to handle demand. Thus, even if a gaming terminal T3 in FIG. 1 was assigned to a first site A07, it may be shifted to another site, such as A04, A05, or A08. If the geographic tracking operation merely relied upon a change in reported cellular site identification, such action would result in a false positive excursion by that terminal from its present site even though it had not been moved. On the other hand, if terminal A3 is physically moved along path 4 though sites A08, A11, and A12, that action would present a genuine alert condition that needs to be recognized.

Figure 2:
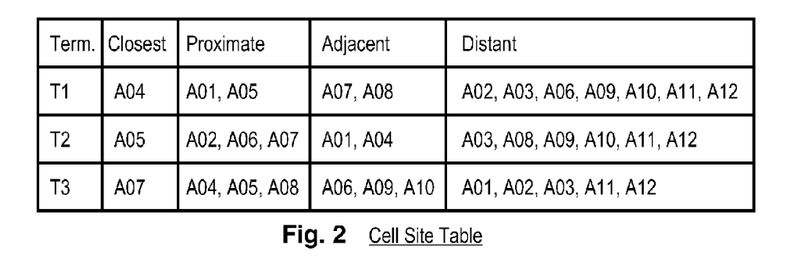
FIG. 2 is a table of terminal and cellular site relationships for fixed asset tracking according to an illustrative embodiment of the present invention.

Now consider FIG. 2, which is a Cell Site Table of terminal and cellular site relationships for fixed asset tracking according to an illustrative embodiment of the present invention. The table corresponds to FIG. 1. Terminal T1 is closest to site A04, but is also proximate to sites A01 and A05. Thus, it is quite likely terminal T1 will "roam" to these sites from time to time, even though it remains at a fixed position due to the close proximity with these sites and the vagaries of radio wave propagation. Further, sites A07 and A08 are adjacent to site A04, so there is a significant probability that terminal T1 will "roam" to these sites from its fixed location as well. On the other hand, the more distant sites are unlikely "roam" destinations from terminal T1. Similar relationships are structured from terminals T2 and T3 in the table. It should be noted that cellular network terminal and site assignments are managed entirely be the cellular network, and that an asset tracking system cannot control these relationships without modification to the operational parameters of the cellular network. All that the tracking device can do is report the cellular site identification that it is currently assigned to, or has been assigned to, or site identifications that it can presently receive. Note, if terminal T1 is moved from its fixed location and travels path 6, it can be appreciated that it will pass through coverage areas of other cellular sites. It will first pass through the coverage area of proximate sites A01 and A05, and then trough distant sites A02 and A03. At times, the cellular network will hand off cellular site assignments for terminal T1, and then report assignment change to its central station (not shown). Same thing for terminal T3 as it moves along path 4. The present invention addresses the fundamental issue of discriminating between cell site changes while the terminal remains fixed, and those that occur due to actual movement of the terminal.

A solution to the foregoing problem of fixed position "roaming" is to understand what cellular sites are most likely to be "roamed" to by a tracking device attached to a fixed asset. Of course, these are most likely the proximate and adjacent cellular sites. Also, it is helpful to understand the rate and frequency with which such "roaming" occurs. This illustrative embodiment of the present invention addresses this issue by establishing a default list of cellular site identities and then comparing each new position report, having a site identity therein, with the default list. If a presently received site identity is on the default list, then it is considered a false positive excursion report and it is ignored. As will be more fully developed, the pattern of activity is also considered over reasonable periods of time such that new site identities can be added to the default list if they are just temporary excursions. Also, a reasonable time period is employed to build the default list in certain illustrative embodiments. This system is effective at minimizing alerts based on false positive excursion reports.

With respect to the reasonable time periods, these times are affected by the nature of the wireless network and tracking requirements, and as a function of time. In the case where alerts must be communicated urgently, then the reaction time of the system is shortened. Also, the default list may be developed during an initialization period, during which it is not necessary to conduct actual tracking operations. On the other hand, in cases where the urgency is lower, a more leisurely approach can be employed. In the case of the foregoing gaming terminal application, inventory tabulation may only be required once per calendar quarter, although verified alert messages would be handled on an immediate basis. With respect to the initialization period, this embodiment activates the position reporting function of the system, but does not activate the alert reporting aspects. Thus, during the initialization period, position reports with site identities therein, are used to populate the default list of known "roaming" site identities. The optimum duration of the initialization period is also affected by the aforementioned reasonable time constraints. Once the initialization period is complete, active tracking occurs and each new position fix is compared to the previously populated default list. The initialization period could range from a few minutes to several days, and is an operational choice based on conditions and performance metrics.

After the initialization period is complete, and regular tracking operations commence, the default list can still grow based on validation algorithms. For example, in an illustrative embodiment, the alert is not generated until there is two consecutive cell identities not found on the default list. Thus, if a first non-listed identity is received, followed by a second listed identity, then the non-listed identity is interpreted as an adjacent site and is added to the default list, thereby providing for organic growth of the default list. From time to time it may be desirable to reset the default list to an empty set and rerun the initialization period. This function can be directed from the central station for from the tracking device. Generally, it is preferable to maintain the default list in the central station, which is typically an Internet server in the illustrative embodiment, although locating the default list elsewhere is an option for the system designer.

During the routine tracking operation, the tracking devices, which are attached to the assets being tracked, receive the cellular transmitter site identities during routine cellular system broadcasts. From time to time, the current site identity is communicated back to the central station through a communications network as a position report. The frequency and period of the position reports is a design choice. They may occur every few seconds, every few minutes, hourly, daily, or perhaps as long as weekly. In addition to repetitive reports, the stimulus for submitting a report may be the receipt by the tracking device of a new and unknown cellular transmitter identity. Also, certain tracking devices may take samples periodically, but report less frequently, and then include all of the samples since the last report. For example, a tracking device may sample every six hours and then report daily, including the four samples from the day. The frequency of the sampling frequency and reporting period is a programmable feature of some tracking devices, and the programming action may be provided from the central station, through the communications network. In addition, the frequency of sampling and reporting may be different during that initialization period than during the tacking function. This is useful to provide a more thorough default list in a shorter time period. And a lower reporting frequency during tracking operations consumes less power in the tracking device.

Figure 3:
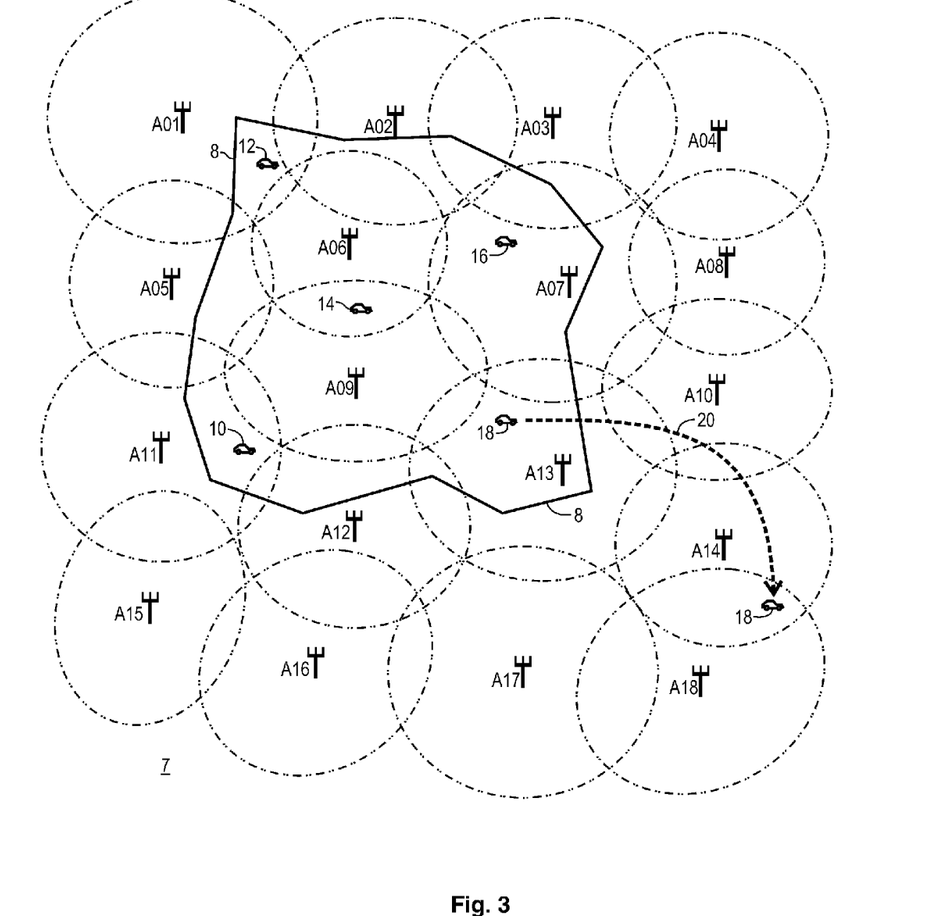
FIG. 3 is an area diagram for a cellular based moving asset tracking system according to an illustrative embodiment of the present invention.

Reference is directed to FIG. 3, which is an area diagram for a cellular based moving asset tracking system according to an illustrative embodiment of the present invention. In the prior embodiments, the concept of tracking a single fixed position asset with a single tracking device to generate a corresponding single default list was presented. It will also be understood that that single asset might move about a predetermined geographic region, and that a corresponding default list of site identities could be generated over time. Examples of such an operational environment are trucking route corridors, shipping and receiving terminal areas, delivery and commercial service areas, police, fire and EMS service regions and so forth, as will be appreciated by those skilled in the art. FIG. 3 presents a geographic region 7 covered by plural cellular transmitter site coverage areas, labeled as A0 through A18. Within that region is service area having boundary 8. For example, that boundary may define a municipality. In this illustrative embodiment, there is a fleet of delivery vehicles, labeled as 10, 12, 14, 16, and 18. During normal operation, and from day to day, the fleet of vehicles moves about the within boundary 8. A departure from that boundary, as in path 20, is designated as an alert condition because the fleet is intended to only operate within the boundary 8 region. Upon review of FIG. 3, it will be appreciated that the most likely transmitter sites to fill the default list would be sites A01-A03, A05-A07, A09, and A11-A13. The challenge is to build a default list of transmitter sites quickly during an initialization period so that tracking operations can commence most quickly.

Since a single vehicle in FIG. 23 might take an extended period of time to travel about within boundary 8 to develop a comprehensive default list, the illustrative embodiment present a challenge for system designers. However, since the entire fleet of vehicles 10, 12, 14, 16, 18 operate within the same boundary 8, they can satisfactorily share a common default list. Furthermore, all of the vehicles can contribute to populating the default list during the initialization period. This approach greatly shortens the requisite duration of the initialization period because it is far more likely that that the entire bounded area 8 will be visited by a vehicle when that are plural vehicles in operation. Once a comprehensive default list has been developed for a particular area, it can be used for all assets tracked within that area, whether they are individual assets or fleets of assets.

Figure 4:
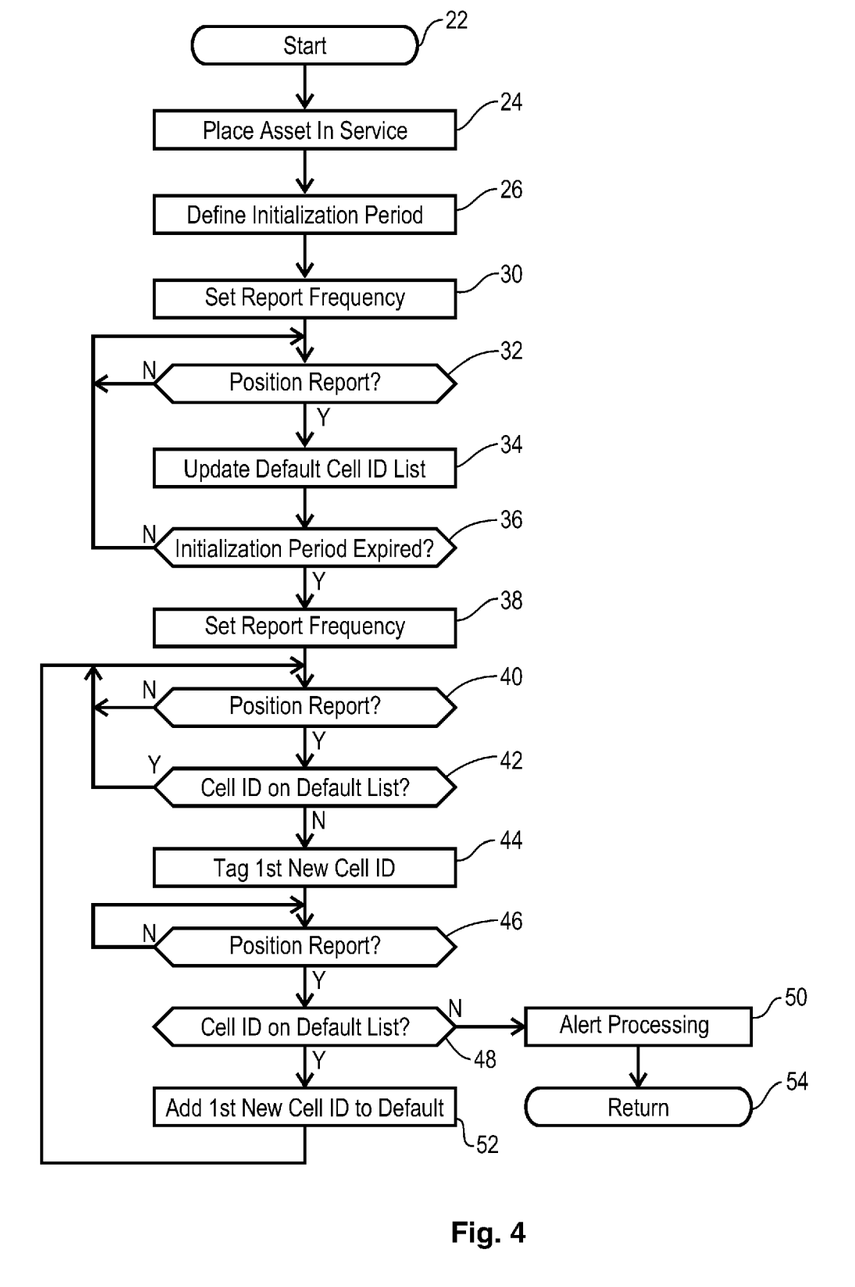
FIG. 4 is a process flow diagram for a cellular based asset tracking system according to an illustrative embodiment of the present invention.

Reference is directed to FIG. 4, which is a process flow diagram for a cellular based asset tracking system according to an illustrative embodiment of the present invention. This figure presents an illustrative embodiment of the present invention where an initialization period is run to generate a default list of site identities, and then tracking operations are commenced. The process begins at step 22 and proceeds to step 24 where an asset and tracking device are placed into service. At step 26, the duration of the initialization period is entered. At step 30, the frequency of reporting during the initialization period is programmed. At step 32, a test is conducted to determine if a position report has been received. If not, the test is repeated until a position report has been received, at which time the process proceeds to step 34. At step 34, the site identity in the position report is extracted and added to the default list of site identities. At step 36, a test is conducted to determine is the initialization period has expired. If not, the process returns to step 32 to continue receiving position reports and updating the default list. If the initialization period has expired at step 36, then the process continues to step 38, where the tracking operation position report frequency is set. At step 40, a test is made to determine if a position report has been received. If not, the test is repeated until a position report is received, and then flow proceeds to step 42.

At step 42, the cell identity is extracted from the present position report and the default list is checked. If the present cell identity is on the default list, the process returns to step 40 to test for another new position report. If, at step 42, the present cell identity is not on the default list, it is tagged as the first new cell identity. The process continues to step 46 to continue testing for new position reports. If the next new position report includes a cell identity that is on the default list, then the tagged cell identity is added to the default list at step 52, and the process returns to step 40 to repeat the foregoing procedure. If, on the other hand at step 48, the present cell identity is not on the default list, the process advanced to step 50 for processing an alert message and returns at step 54. Thus, from the foregoing process, it can be appreciated how the illustrative embodiment discriminates occasional new cell identities, and perhaps adds them to the default list, and actual roaming movement of an asset, for which an alert message is the appropriate response.

Figure 5:
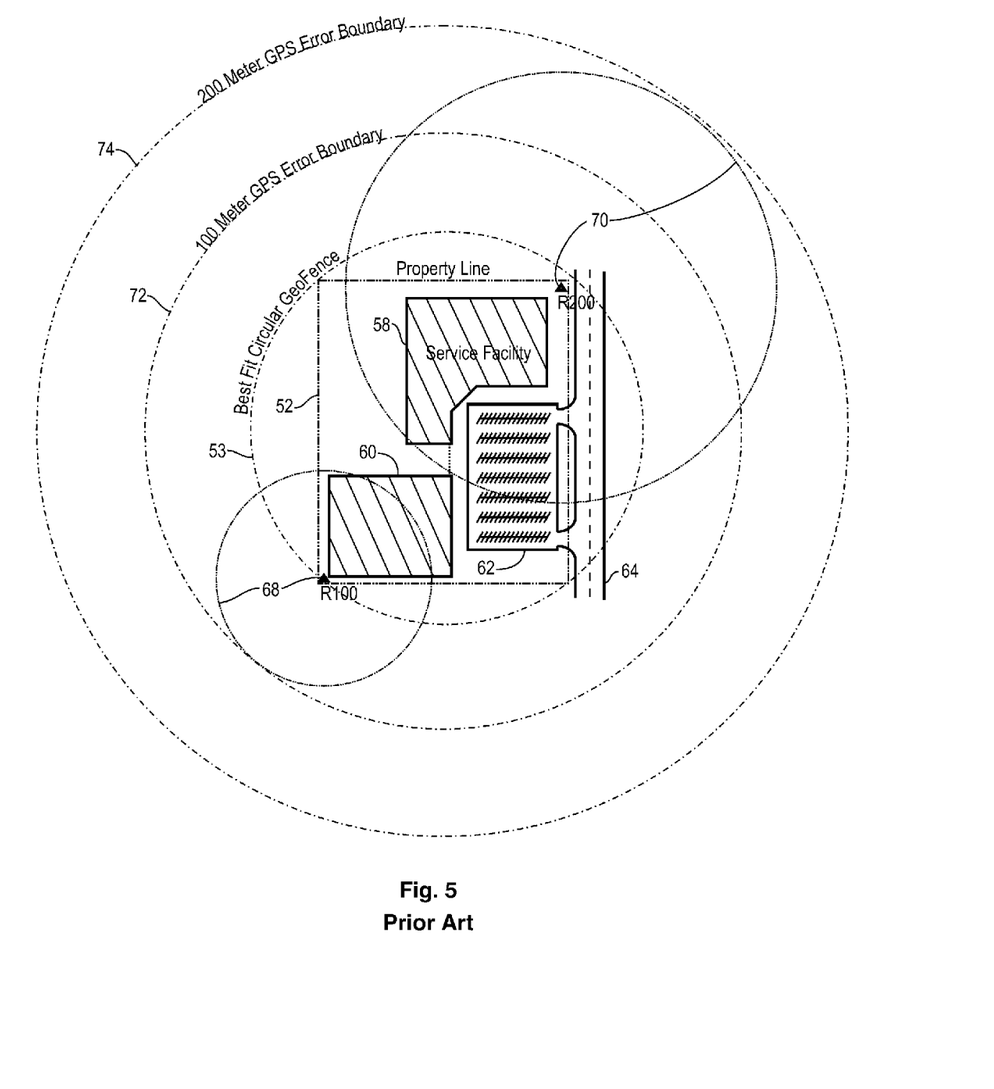
FIG. 5 is a drawing illustrating prior art geofence error boundaries.

Reference is direct to FIG. 5 is a drawing illustrating prior art geofence error boundaries. This scenario illustrates certain problems manifested in position tracking where the position fix is based on GPS coordinates gathered by the tracking device and forwarded in position report to a central station. FIG. 5 present a service facility bounded by a property line 52 and having a main building 58, a secondary building 60 and a parking lot 62. By way of a real world example, perhaps this facility is an extended care facility for the elderly who have diminished capacity, and who would benefit form location monitoring to assure no one wanders into harm's way. Such individuals may wear a bracelet that track their geographic location using a GPS receiver and a wireless transceiver to periodically report there geographic fix. As such, this is an environment where a predetermined geofence is useful. Since the facility is secure within the property line 52, it is important to provide an alert when a tracking device moves out of the property. For a number of reasons, radial geofence definitions are employed, as will be appreciated by those skilled in the art. Most notably of these is the fact that tracking devices with minimal processing power can simply compare each given GPS fix with an internal radial geofence definition, and communicate a position report that includes and indication that the present geographic fix is outside the geofence. Therefore, in FIG. 5, attention is directed to the best fit geofence circle 53. IT should also be noted that a polygonal geofence can readily be defined, and that such a geofence could track the property line 52 if desired.

While the illustration in FIG. 5 showing the property line 52 and best fit geofence circle 53 appears to define a tightly controlled geofence boundary alert system, the vagaries of GPS receiver performance demonstrate that the reliability of excursion reports for that geofence will regularly come into questions. For GPS receives to achieve a higher degree of position fit accuracy, they require a clear view of plural GPS satellites, and that is a condition achievable only out of doors with an unobstructed antenna and with clear atmospheric conditions. In that case, the accuracy of the GPS report may achieve a circular probably error of about ten meters, which is quite good for single fix civilian grade GPS access. Real world experience will quickly demonstrate that GPS position fix error radiuses of one hundred meters are very common (see the R100 error circle 68), and that error radius of two hundred meters and more are common (see R200 error circle 70). In fact, while a tracking device is located in-doors, it is safe to assume the position fix errors will substantially exceed ten meters. Since false positive excursion reports are highly problematic, in terms of response, asset consumption, and general mistrust of a tracking system function, the prior art approach as been to expand the definition of the geofence boundary to encompass the error region. In FIG. 5, note one hundred meter GPS error boundary 72, and the two hundred meter GPS error boundary 74. While expanding the error boundary is effective at reducing false positive reports, it also increases the likelihood that a monitored individual or asset has moved out of the proper area or safe region, where an alert should be communicated.

Figure 6:
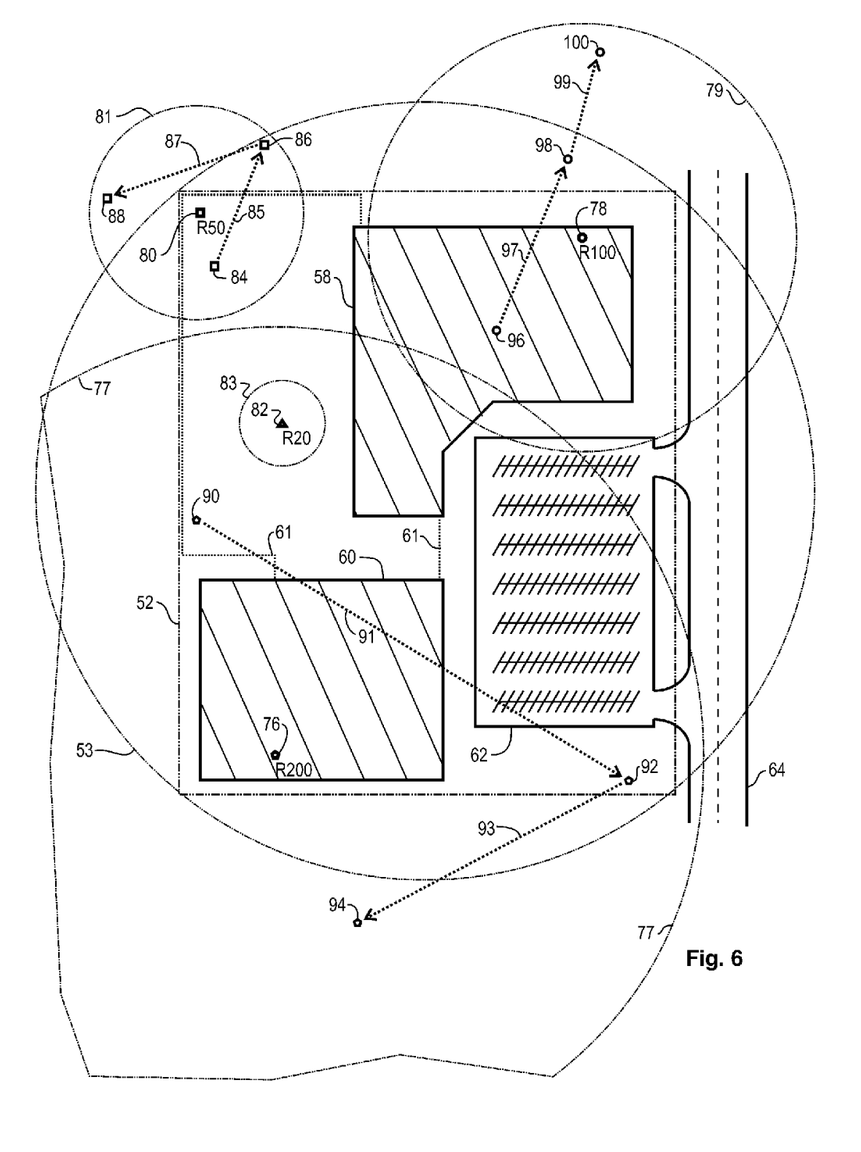
FIG. 6 is an area diagram for a GPS based asset tracking system according to an illustrative embodiment of the present invention.

Reference is directed to FIG. 6, which is an area diagram for a GPS based asset tracking system according to an illustrative embodiment of the present invention. Figure 6 presents the same service facility discussed with respect to FIG. 5, however, FIG. 6 presents one illustrative embodiment of the present invention for detecting false positive geofence boundary excursions. Note that the service facility boundary 52 encloses the first building 58, the second building 60, the parking lot 62 and a fenced in yard 61 outside the buildings. A roadway 64 services the facility. The best-fit radial geofence 53 is illustrated for reference, and this is the geofence definition used by tracking devices to report any excursion from the geofence along with the usual position report having a position fix therein. In other words, the tracking devices of this embodiment report both the present position fix and a report as to whether it crosses outside the boundary 53. Four position error circles are presented in FIG. 6. Consider error circle 83, which is labeled "R20 to indicate the circular error is twenty meters from the tracking device 82 located at its center. In other words, if the tracking device 82 is located at the triangle "R20" at the center of circle 83, then the GPS fix of may report from time to time can be anywhere within circle 83, even though the tracking device 82 is actually at the geometric center of that circle 83. Since tracking device 82 is out of doors and has a relatively small error circle of twenty meters, which is located completely within the radial geofence 53, there is virtually no change that it will report a geofence excursion in a position report.

In FIG. 6, now consider tracking device 80 with its "R50" fifty meter error circle 81. Again, the tracking device 80 is located at the center of the circle 81, and the tracking device 80 is physically located inside the geofence 53. However, the fifty meter error circle 81 lies partly outside the geofence 53. Therefore, there is a significant probability that tracking device 80 will report position fixes that show positive geofence excursions even though the tracking device is physically within the geofence boundary. GPS position fixes 84, 86, 88 represent possible position fixes received from tacking device 80. Similarly, tracking device 78 is located within building 58 and has a larger error circle "R100" of one hundred meters, yielding error circle 79. The tracking device 78 is located at the center of the circle 79, and the tracking device 78 is also inside the geofence 53. However, the one hundred meter error circle 79 lies substantially outside the geofence 53. Therefore, it is more likely that tracking device 78 will report position fixes that show positive geofence excursions even though the tracking device is physically within the geofence boundary. GPS position fixes 96, 98, and 100 represent possible position fixes received from tacking device 80. And finally, tracking device 76 is located within building 60 and has an even larger error circle "R200" of two hundred meters, yielding error circle 77. The tracking device 76 is located at the center of the circle 77, and the tracking device 76 is also inside the geofence 53. However, the two hundred meter error circle 77 lies even more substantially outside the geofence 53. Therefore, it is likely that tracking device 77 will report position fixes that show positive geofence excursions even though the tracking device is physically within the geofence boundary. GPS position fixes 90. 92, and 94 represent possible position fixes received from tacking device 80. The issue is discriminating between true positive excursion reports and false positive excursion reports.

Figure 7:
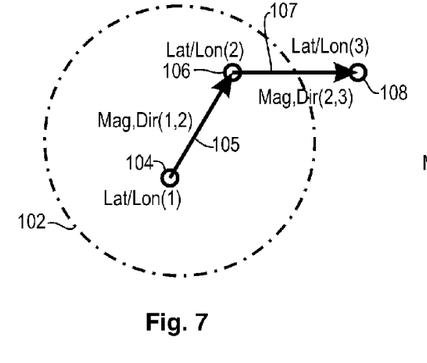
FIG. 7 is a movement tracking diagram for a GPS based asset tracking system according to an illustrative embodiment of the present invention.
Figure 8:
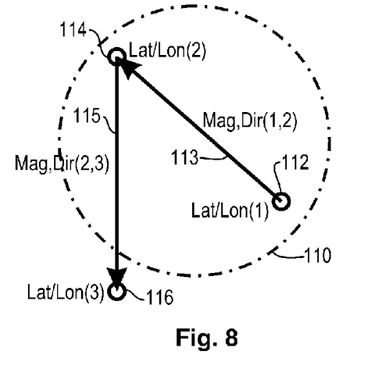
FIG. 8 is a movement tracking diagram for a GPS based asset tracking system according to an illustrative embodiment of the present invention.

Reference is directed to FIG. 7 and FIG. 8, which are movement tracking diagrams for a GPS based asset tracking system according to an illustrative embodiment of the present invention. The generalized approach to this illustrative embodiment of the present invention for discriminating false positive excursions is to maintain a running buffer of previous position reports, and then upon receiving a boundary excursion report, analyzing the trend on position fixes to determine confidence in whether the current report is a true of false excursion report. One way this can bet accomplished is to calculate vectors between position fixes and compare the angles and magnitudes to determine trends of movement. In general, if the trend of movement continues away from a first fix, it is more likely that the current position report is a true excursion. On the other hand, if the trend of movement folds back on itself, or becomes more random, it is more likely a false positive excursion report. FIG. 7 illustrates an example of the former, and FIG. 8 illustrates an example of the latter.

FIG. 7 illustrates a pattern of position fixes that tend away from the first fix. In this diagram, a radial geofence boundary 102 is presented, with a first position fix 104 in the form of a lat/lon(1), indicating that it is first in time in a buffer. The next position fix 106 in the form of lat/long(2) is also within the geofence boundary. The first two position fixes can thus be used to define a first vector 105, in the form of a magnitude and direction as mag/dir(1,2). A third position fix 108 in the form of lat/lon(3) is located outside of the geofence 102, and therefore incorporates an excursion report. The second and third positions fixes are used to calculate a second vector 107 in the form mag/dir(2,3). Having the first vector 105 and the second vector 107 enables the calculation of relative directions and magnitudes, which are useful to establish the trend of movement in the position reports. FIG. 8 illustrates a pattern of position fixes that tends to fold back on itself from the first position fix. Position fix 112 (lat/lon(1)) is the first, followed by fix 114 (lat/lon(2)), and then fix 116 (lat/lon(3)), which is outside the geofence 110. These three fixes enable the calculation of the first vector 113 (mag/dir(1,2)) and the second vector 115 (mag/dir(2,3)).

Figure 9:
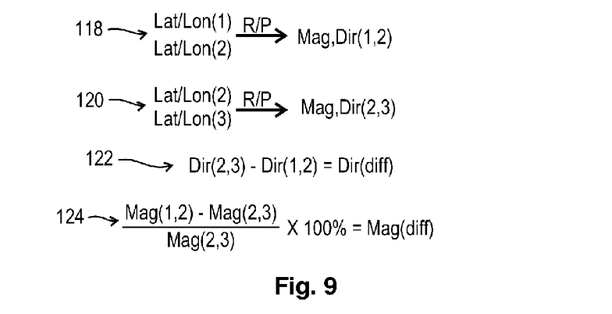
FIG. 9 is a movement tracking process for a GPS based asset tracking system according to an illustrative embodiment of the present invention.

Reference is directed to FIG. 9, which presents a movement tracking calculation process for a GPS based asset tracking system according to an illustrative embodiment of the present invention. These calculations are applicable to the illustrative embodiments of FIG. 7 and FIG. 8. In FIG. 9, the first calculation 118 accomplishes a rectangular to polar conversion of the first fix (lat/lon(1)) and second fix (lat/lon(2)) to establish the first vector (mag/dir(1,2)). Similarly, the second calculation 120 accomplishes a rectangular to polar conversion of the second fix (lat/lon(2)) and third fix (lat/lon(3)) to establish the first vector (mag/dir(2,3)). The third calculation 122 computes the difference in the direction between the second vector (dir(2,3)) and the first vector (dir(1,2)). The fourth calculation 124 computes the difference is magnitude between the first vector (mag(1,2)) and the second vector (mag(2,3)). Having established the changes in direction and magnitude, a process of comparison is used to establish the probability of an true or false positive excursion report.

Figure 10:
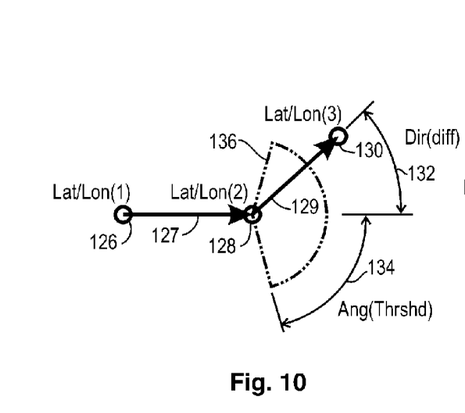
FIG. 10 is a error determination process diagram for a GPS based asset tracking system according to an illustrative embodiment of the present invention.
Figure 11:
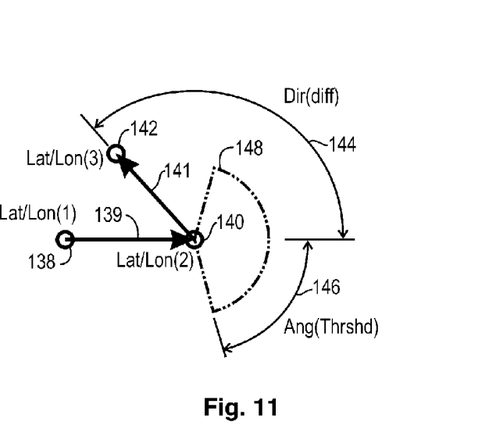
FIG. 11 is a error determination process diagram for a GPS based asset tracking system according to an illustrative embodiment of the present invention.

FIG. 10 and FIG. 11 illustrate the direction and threshold comparison process for establishing the likelihood of true and false positive excursion reports according to an illustrative embodiment of the present invention. FIG. 10 illustrates the process of establishing that a true positive excursion report has been received. A third position fix 130 (lat/lon(3)) is received and indicates excursion from a geofence boundary. A first fix 126 (lat/lon(1)) and a second fix 128 (lat/lon(2)) are recalled from a buffer. The first vector 127 and second vector 129 are calculated and used to determine the direction difference angle 132 (dir(dif)) there between. This differential angle 132 is compared with a angular threshold 134. The angular threshold applies to both directions away from the first vector 127, thereby establishing an angular range 136 that imply a continued direction away from the first fix 126. Within this angular range 136, the differential angle 132 is assumed to imply a true positive excursion. The magnitude of angular threshold 134 is a programmable option in the system.

FIG. 11 illustrates the process of establishing that a false positive excursion report has been received. A third position fix 142 (lat/lon(3)) is received and indicates excursion from a geofence boundary. A first fix 138 (lat/lon(1)) and a second fix 140 (lat/lon(2)) are recalled from a buffer. The first vector 139 and second vector 141 are calculated and used to determine the direction difference angle 144 (dir(dif)) there between. This differential angle 144 is compared with a angular threshold 146. The angular threshold applies to both directions away from the first vector 139, thereby establishing an angular range 148 that imply a folded back direction toward the first fix 138. Outside this angular range 148, the differential angle 144 is assumed to indicate a false positive excursion. The magnitude of angular threshold 146 is a programmable option in the system.

Figure 12:
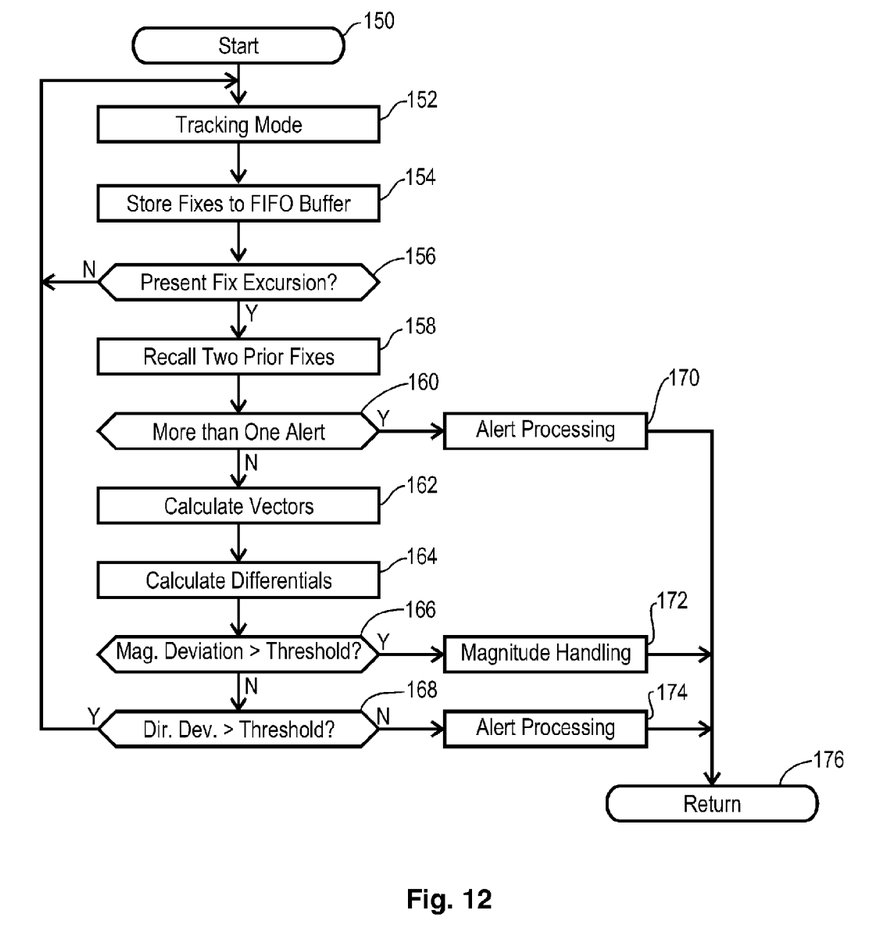
FIG. 12 is a process flow diagram for a GPS based asset tracking system according to an illustrative embodiment of the present invention.

Reference is directed to FIG. 12, which is a process flow diagram for a GPS based asset tracking system according to an illustrative embodiment of the present invention. The process begins at step 150 and proceeds to step 152 where the tracking mode of operation commences. As position reports are received from tracking devices, the position fixes therein, in the form of lat/lon coordinates, are stored in a first-in, first-out (FIFO) buffer, that is updated with each position report. At step 156, a test is conducted from each position fix to determine if it is an excursion from the geofence boundary. If no, the tracking operation continues. If it is an excursion at step 156, the process is directed to step 158. At step 158, the process recalls the two prior position fixes from the FIFO buffer. At step 160, a test is conducted to determine if more than one of the three fixes is an excursion report. If that is true, then the process processes an alert at step 170. If the there is not more than one excursion at step 160, then the process calculates the vectors from the first to second and second to thirds position reports at step 162. At step 164, the differential angles and magnitudes are calculated. At step 166, a test is conducted to determine if the differential magnitude exceeds the threshold magnitude differential. If it does, then the process goes to step 172 where the magnitude differential is addressed. If the magnitude does not exceed the threshold at step 166, then the process compares the direction differential to a direction threshold angle at step 168. If the direction differential is greater than the threshold angle, it is interpreted as a fold-back report, indicating a false positive excursion report, and the process returns to the tracking mode at step 152. On the other hand, at step 168, if the direction differential is less then the threshold angle, it is interpreted as a true positive excursion report and an alert is processed at step 174. All of steps 170, 172, and 174 return 176 to the main process upon completion.

Figure 13:
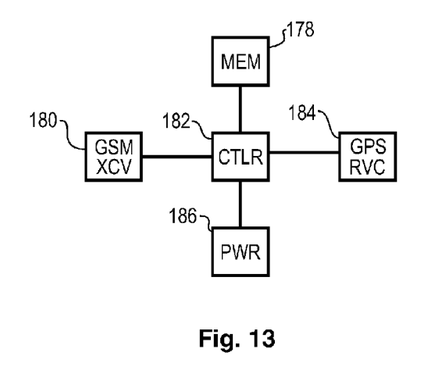
FIG. 13 is a functional block diagram of a GPS based tracking device according to an illustrative embodiment of the present invention.

Reference is directed to FIG. 13, which is a functional block diagram of a GPS based tracking device according to an illustrative embodiment of the present invention. Purpose built GPS based tracking devices are manufactured and provided by a number of suppliers, and these can be adapted to the systems and methods of the present invention. In general, a GPS tracking device is a compact battery powered wireless device that can both receive GPS signals to produce GPS position fixes, and that have a radio transceiver to enable communications with a wireless communications network. Thus, in FIG. 13, there is a central controller 182 operably coupled to a GPS receiver 184 and a GSM cellular telephone transceiver 180. Of course, any suitable wireless protocol transceiver known to those skilled in the art could be employed. A power source 186, such as a storage battery, powers the tracking device. A memory 178 is provided to store variables and program data. It should also be appreciated that many current cellular telephones already provide a GPS receiver and related functionality. Thus it can be appreciated that any person or thing carrying such a cellular telephone could be tracked in accordance with the teachings of the present invention.

Figure 14:
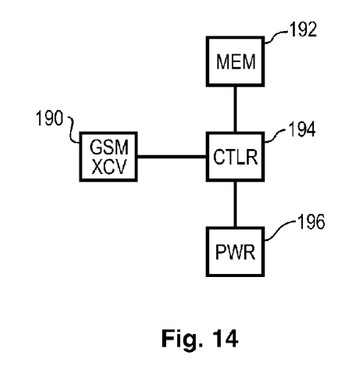
FIG. 14 is a functional block diagram of a cellular cased tracking device according to an illustrative embodiment of the present invention.

Reference is directed to FIG. 14, which is a functional block diagram of a cellular based tracking device according to an illustrative embodiment of the present invention. The apparatus of FIG. 14 is suitable for use with the fixed wireless transmitter illustrative embodiments of the present invention. This tracking device is also a battery powered portable device for coupling with an asset and used for tracking its location over time. A controller 194 is operatively coupled to a GSM cellular transceiver and a battery power source. Of course, any suitable wireless protocol transceiver known to those skilled in the art could be employed. The transceiver 190 is used for both receiving site identities from fixed location wireless transmitters and for communicating position reports to the central station. In addition, a memory 192 is coupled to the controller 194 for storing variables and program data.

Figure 15:
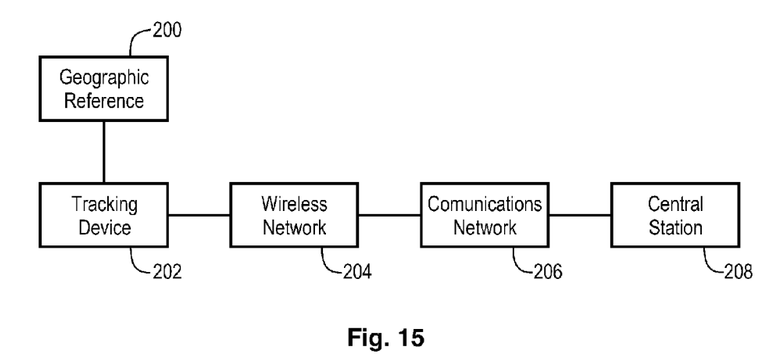
FIG. 15 is a system level functional block diagram according to an illustrative embodiment of the present invention.

Reference is directed to FIG. 15, which is a system level functional block diagram according to an illustrative embodiment of the present invention. The systems and methods of the illustrative embodiment are coupled together and function in this, and other, structural environments. A sort of geographic reference 200 is provided, such as from a GPS satellite constellation or a network of fixed location wireless transmitters. The tracking device 202 receives the geographic fix and from time to time transmits them into a wireless communications network 204 as a portion of a position report. The position reports are further communicated through a communications network 206, which may be the same network as the wireless network, or may be another network such as the Internet. These reports are received by a central station 208 coupled to the communications network 206. The central station 208 may be a computing device such as an Internet network server or other suitable machine.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method of tracking assets from central stations using tracking devices enabled to receive site identities broadcast from transmitters at fixed locations within a wireless network, and enabled to wirelessly communicate position reports to the central stations, the method comprising the steps of:
   attaching a tracking device to an asset, and placing said asset into service within the wireless network;
   tracking the location of said asset by periodically communicating position reports containing current site identities from said tracking device to a central station;
   upon receipt at said central station of a first position report containing a first site identity, comparing said first site identity with a default list of site identities corresponding to said tracking device;
   disregarding said first position report and continuing said tracking step if said first site identity is found within said default list;
   storing said first site identity if said first site identity is not found within said default list;
   upon receipt at said central station of a subsequent position report containing a second site identity, comparing said second site identity with said default list;
   adding said first site identity to said default list and continuing said tracking step if said second site identity is found on said default list, and producing an alert signal if said second site identity is not found on said default list.

2. The method of claim 1, and wherein the wireless network is a cellular telephone network, and wherein said periodically communicating position reports step is accomplished using the cellular telephone network.

3. The method of claim 2, and wherein said tracking device is a conventional cellular telephone.

4. The method of claim 1, and wherein said central station is an Internet server.

5. The method of claim 1, further comprising the steps of:
   defining an initialization period duration;
   during said initialization period, adding all of the site identities received in said position reports to said default list of site identities corresponding to said tracking device.

6. The method of claim 5, further comprising the steps of:
   running said initialization period upon receiving a corresponding command from said tracking device or said central station.

7. The method of claim 1, further comprising the steps of:
   attaching plural tracking devices to plural assets;
   during said initialization period, additionally, adding all of the site identities received in said position reports from said plural tracking devices to said default list of site identities.

8. The method of claim 1, further comprising the step of:
   storing said default list of site identities in said central station.

9. The method of claim 1, further comprising the step of:
   predetermining said default list of site identities prior to performing said tracking step.

10. A system for tracking assets by utilizing site identities broadcast from transmitters at fixed locations within a wireless network, comprising:
    a central station coupled to a communications network;
    a tracking device, for attaching to an asset, operable to receive the site identities broadcast from transmitters at fixed locations within the wireless network, and operable to wirelessly communicate position reports to said central station through said communications network, and wherein
    said central station is operable to track the location of said tracking device by periodically receiving position reports containing current site identities from said tracking device, and wherein
    said central station is operable to, upon receipt of a first position report containing a first site identity, compare said first site identity with a default list of site identities corresponding to said tracking device, and wherein
    said central station is operable to disregard said first position report and continue tracking said tracking device if said first site identity is found within said default list, and wherein
    said central station is operable to store said first site identity if said first site identity is not found within said default list, and wherein
    said central station is operable to, upon receipt of a subsequent position report containing a second site identity, compare said second site identity with said default list, and wherein
    said central station is operable to add said first site identity to said default list and continue tracking said tracking device if said second site identity is found on said default list, and wherein
    said central station is operable to produce an alert signal if said second site identity is not found on said default list.

11. The system of claim 10, and wherein said wireless network is a cellular telephone network, and wherein said communications network is the Internet.

12. The system of claim 11, and wherein said tracking device is a conventional cellular telephone.

13. The system of claim 10, and wherein said central station is an Internet server.

14. The system of claim 10, and wherein:
    said central station is operable to define a duration of an initialization period, and wherein
    said central station is operable to add all of said site identities received in said position reports to said default list of site identities corresponding to said tracking device during said initialization period.

15. The system of claim 14, and wherein:
    said central station is operable to rung said initialization period upon receipt of a corresponding command.

16. The system of claim 10, further comprising:
    plural tracking devices attached to plural assets, and wherein said central station is operable, during said initialization period, to additionally add all of the site identities received in said position reports from said plural tracking devices to said default list of site identities.

17. The system of claim 10, and wherein:
said default list of site identities are stored in said central station prior to receipt of a position report from said tracking device.

18. A method of tracking assets to detect valid geofence boundary excursions from central stations using tracking devices enabled to produce present location geographic fixes, and enabled to wirelessly communicate position reports to the central stations, the method comprising the steps of:
attaching a tracking device to an asset, and placing said asset into service within the boundary of the geofence;
tracking the location of said asset by periodically communicating position reports containing present geographic fixes from said tracking device to a central station, and repeatedly updating a buffer for storing a previous position fix and a penultimate position fix;
receiving a present position report having a present position fix, and updating said buffer;
determining if said present position fix is an excursion from the geofence boundary;
continuing said tracking step if said present position fix is not an excursion;
if said present position fix is an excursion, then calculating a first vector angle between said penultimate fix and said previous fix, and calculating a second vector angle between said previous position fix and said present position fix, and calculating a differential angle between said first vector angle and said second vector angle;
comparing said differential angle with a threshold angle;
continuing said tracking step if said differential angle is greater than said threshold angle, and
producing an alert signal if said differential angle is less than said threshold angle.

19. The method of claim 18, and wherein said central station is an Internet server.

20. The method of claim 18, and wherein:
said periodically communicating position reports step is accomplished using a cellular telephone network.

21. The method of claim 18, and wherein:
said communicating position reports step is preformed repeatedly at fixed time intervals.

22. The method of claim 18, and wherein:
said communicating position reports step is preformed upon the occurrence of an excursion from said geofence boundary.

23. The method of claim 18, further comprising the steps of:
upon determining that said present position fix is an excursion from the geofence boundary, and if said previous fix was also an excursion from the geofence boundary, then producing an alert signal.

24. The method of claim 18, further comprising the steps of:
storing a radial geofence boundary in said tracking device, and wherein
said determining if said present position fix is an excursion from the geofence boundary step is accomplished by said tracking device.

25. The method of claim 18, and wherein said geographic fix includes GPS position data.

26. The method of claim 18, further comprising the steps of:
if said present position fix is an excursion, then calculating a first vector length between said previous position fix and said present position fix;
comparing said first vector length with a factor proportional to the geofence size, and
producing an alert signal if said first vector length exceeds said proportional factor.

27. A system for tracking assets located within a geofence boundary to detect valid geofence boundary excursions, comprising:
a central station coupled to a communications network;
a tracking device, for attaching to an asset, operable to produce present location geographic fixes, and operable to wirelessly communicate position reports to said central station, and wherein
said central station is operable to track the location of said asset by periodically receiving position reports containing present geographic fixes from said tracking device, and operable to repeatedly update a buffer having a previous position fix and a penultimate position fix stored therein, and wherein
said central station is operable to receive a present position report having a present position fix, and operable to update said buffer upon receipt of said present position report, and wherein
said central station is operable to determine if said present position fix is an excursion from the geofence boundary, and wherein
said central station is operable to continue to track said tracking device if said present position fix is not an excursion, and wherein
said central station is operable, if said present position fix is an excursion, to calculate a first vector angle between said penultimate fix and said previous fix, and operable to calculate a second vector angle between said previous position fix and said present position fix, and operable to calculate a differential angle between said first vector angle and said second vector angle, and wherein
said central station is operable to compare said differential angle with a threshold angle, and wherein
said central station is operable to continue to track said tracking device if said differential angle is greater than said threshold angle, and wherein
said central station is operable to produce an alert signal if said differential angle is less than said threshold angle.

28. The system of 27, and wherein said central station is an Internet server.

29. The system of claim 27, and wherein:
said position reports are communicated using a cellular telephone network.

30. The system of claim 27, and wherein:
said position reports are communicated repeatedly at fixed time intervals.

31. The system of claim 27, and wherein:
said position reports are communicated upon the occurrence of an excursion from said geofence boundary.

32. The system of claim 27, and wherein:
said central station is operable, upon determination that said present position fix is an excursion from the geofence boundary, and if said previous fix was also an excursion from the geofence boundary, to produce an alert signal.

33. The system of claim 27, and wherein:
said tracking device is operable to store a radial geofence boundary therein, and wherein
said tracking device is operable to determine if said present position fix is an excursion from the geofence boundary.

34. The system of claim 27, and wherein said geographic fix includes GPS position data.

35. The system of claim 27, and wherein:

said central station is operable, if said present position fix is an excursion, to calculate a first vector length between said previous position fix and said present position fix, and wherein said central station is operable to compare said first vector length with a factor proportional to the geofence size, and wherein said central station is operable to produce an alert signal if said first vector length exceeds said proportional factor.

* * * * *